(12) United States Patent
Edwin et al.

(10) Patent No.: US 11,686,944 B2
(45) Date of Patent: Jun. 27, 2023

(54) METHOD AND SYSTEM FOR HIGH RESOLUTION DIGITIZED DISPLAY

(71) Applicant: Magic Leap, Inc., Plantation, FL (US)

(72) Inventors: Lionel Ernest Edwin, Plantation, FL (US); Ivan Li Chuen Yeoh, Tampa, FL (US); Brian T. Schowengerdt, Seattle, WA (US); Kevin Richard Curtis, Boulder, CO (US); William Hudson Welch, Fort Lauderdale, FL (US); Pierre St. Hilaire, Belmont, CA (US); Hui-Chuan Cheng, Cooper City, FL (US)

(73) Assignee: Magic Leap, Inc., Plantation, FL (US)

( * ) Notice: Subject to any disclaimer, the term of this patent is extended or adjusted under 35 U.S.C. 154(b) by 151 days.

(21) Appl. No.: 16/860,756

(22) Filed: Apr. 28, 2020

(65) Prior Publication Data

US 2020/0326546 A1 Oct. 15, 2020

Related U.S. Application Data

(62) Division of application No. 15/826,315, filed on Nov. 29, 2017, now Pat. No. 10,678,055.

(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0023* (2013.01);
(Continued)

(58) Field of Classification Search
CPC .............. G02B 27/0172; G02B 6/0016; G02B 6/0023; G02B 2027/0147;
(Continued)

(56) References Cited

U.S. PATENT DOCUMENTS 3,544,200 A 12/1970 Boll
5,886,822 A 3/1999 Spitzer
(Continued)

FOREIGN PATENT DOCUMENTS

AU 2017366896 A1 5/2019
CA 3045046 A1 6/2018
(Continued)

OTHER PUBLICATIONS

U.S. Appl. No. 15/826,315, Final Office Action, dated Sep. 27, 2019, 18 pages.
(Continued)

*Primary Examiner* — George G. King
(74) *Attorney, Agent, or Firm* — Kilpatrick Townsend & Stockton LLP

(57) ABSTRACT

A method and system for increasing dynamic digitized wavefront resolution, i.e., the density of output beamlets, can include receiving a single collimated source light beam and producing multiple output beamlets spatially offset when out-coupled from a waveguide. The multiple output beamlets can be obtained by offsetting and replicating a collimated source light beam. Alternatively, the multiple output beamlets can be obtained by using a collimated incoming source light beam having multiple input beams with different wavelengths in the vicinity of the nominal wavelength of a particular color. The collimated incoming source light beam can be in-coupled into the eyepiece designed for the nominal wavelength. The input beams with multiple wavelengths take different paths when they undergo total internal reflection in the waveguide, which produces multiple output beamlets.

10 Claims, 16 Drawing Sheets

Related U.S. Application Data

(60) Provisional application No. 62/428,510, filed on Nov. 30, 2016.

(52) U.S. Cl.
CPC ...... *G02B 6/0038* (2013.01); *G02B 2027/011* (2013.01); *G02B 2027/0138* (2013.01); *G02B 2027/0147* (2013.01); *G02B 2027/0178* (2013.01)

(58) Field of Classification Search
CPC .......... G02B 2027/0178; G02B 6/0033; G02B 6/0038; G02B 2027/011; G02B 2027/0138
See application file for complete search history.

(56) References Cited

U.S. PATENT DOCUMENTS

| | | | |
|---|---|---|---|
| 6,897,992 | B2 | 5/2005 | Kikuchi |
| 7,206,107 | B2 | 4/2007 | Levola |
| 9,791,700 | B2 | 10/2017 | Schowengerdt |
| 10,678,055 | B2 | 6/2020 | Edwin et al. |
| 2002/0061178 | A1 | 5/2002 | Winston et al. |
| 2002/0181103 | A1 | 12/2002 | Davydov |
| 2004/0257664 | A1 | 12/2004 | Hashimoto et al. |
| 2006/0114420 | A1 | 6/2006 | Kim et al. |
| 2012/0062998 | A1 | 3/2012 | Schultz et al. |
| 2013/0014380 | A1 | 1/2013 | Tanimura |
| 2013/0077049 | A1 | 3/2013 | Bohn |
| 2015/0016777 | A1 | 1/2015 | Abovitz et al. |
| 2015/0153569 | A1* | 6/2015 | Yonekubo ............ G02B 27/144 359/629 |
| 2015/0241844 | A1 | 8/2015 | Horikawa |
| 2015/0277124 | A1 | 10/2015 | Ide et al. |
| 2015/0279114 | A1 | 10/2015 | Yonekubo |
| 2015/0346490 | A1 | 12/2015 | Tekolste et al. |
| 2016/0041387 | A1 | 2/2016 | Valera et al. |
| 2016/0048018 | A1 | 2/2016 | De Matos |
| 2016/0143539 | A1 | 5/2016 | Koerner et al. |
| 2016/0231567 | A1 | 8/2016 | Saarikko et al. |
| 2016/0231568 | A1 | 8/2016 | Saarikko et al. |
| 2016/0270656 | A1 | 9/2016 | Samec et al. |
| 2016/0327789 | A1 | 11/2016 | Klug et al. |
| 2017/0075119 | A1* | 3/2017 | Schultz ............. G02B 27/0172 |
| 2017/0176745 | A1* | 6/2017 | Poon .................... G02B 27/286 |
| 2017/0307886 | A1 | 10/2017 | Stenberg et al. |
| 2018/0149873 | A1 | 5/2018 | Edwin et al. |

FOREIGN PATENT DOCUMENTS

| | | |
|---|---|---|
| CN | 1444734 A | 9/2003 |
| CN | 1554033 A | 12/2004 |
| CN | 1641764 A | 7/2005 |
| CN | 1779502 A | 5/2006 |
| CN | 101730859 A | 6/2010 |
| CN | 101952765 A | 1/2011 |
| CN | 104335117 A | 2/2015 |
| CN | 104678555 A | 6/2015 |
| CN | 105093366 A | 11/2015 |
| CN | 105572873 A | 5/2016 |
| CN | 110023819 A | 7/2019 |
| EP | 2165232 A1 | 3/2010 |
| EP | 3548959 A1 | 10/2019 |
| IN | 201947018178 | 5/2019 |
| JP | 07311302 A | 11/1995 |
| JP | 08114705 A | 5/1996 |
| JP | 2003536102 A | 12/2003 |
| JP | 2006501499 A | 1/2006 |
| JP | 2007219106 A | 8/2007 |
| JP | 2015106105 A | 6/2015 |
| JP | 2016516221 A | 6/2016 |
| JP | 2020501185 A | 1/2020 |
| KR | 20190086763 A | 7/2019 |
| SU | 1163161 A1 | 6/1985 |
| TW | 201831959 A | 9/2018 |
| WO | 0014836 A1 | 3/2000 |
| WO | 2016094940 A1 | 6/2016 |
| WO | 2018102445 A1 | 6/2018 |

OTHER PUBLICATIONS

U.S. Appl. No. 15/826,315, Non-Final Office Action, dated Jun. 11, 2019, 10 pages.
U.S. Appl. No. 15/826,315, Notice of Allowance, dated Jan. 31, 2020, 18 pages.
Chinese Application No. 201780073726.X, Office Action, dated Feb. 20, 2021, 15 pages (10 pages of Original Document and 5 pages of English Translation).
European Application No. EP17875416.4, Extended European Search Report, dated Nov. 14, 2019, 8 pages.
European Application No. EP17875416.4, Office Action, dated May 25, 2021, 5 pages.
International Application No. PCT/US2017/063763, International Preliminary Report on Patentability, dated Jun. 13, 2019, 9 pages.
International Application No. PCT/US2017/063763, International Search Report and Written Opinion, dated Mar. 8, 2018, 10 pages.
Taiwanese Application No. 106141820, Office Action, dated Aug. 5, 2021, 27 pages (14 pages of Original Document and 13 pages of English Translation).
Application No. CN201780073726.X , Office Action and English Translation, dated Aug. 16, 2021, 11 pages.
AU2017366896, "First Examination Report", dated Nov. 25, 2021, 4 pages.
Application No. CN201780073726.X, Office Action and English Translation, dated Jan. 18, 2022, 6 pages.
Application No. JP2019-528665, Office Action and English Translation, dated Nov. 30, 2021, 11 pages.
Takeuchi et al., "Two-Beam X-Ray Holography Using Prism Optics", Japanese Journal of Applied Physics, vol. 44, No. 5, May 10, 2005, pp. 3293-3298.
Application No. TW106141820, Notice of Decision to Grant and English Translation, dated Jan. 3, 2022, 4 pages.
Application No. CN201780073726.X, Notice of Decision to Grant and English Translation, dated Mar. 25, 2022, 3 pages.
Application No. IL266822, Office Action, dated May 12, 2022, 3 pages.
Application No. IN201947018178, "First Examination Report", dated Mar. 18, 2022, 5 pages.
Application No. KR10-2019-7018964, Office Action and English Translation, dated Jun. 14, 2022, 18 pages.
Application No. JP2019-528665, "Office Action" and English Translation, dated Jun. 29, 2022, 7 pages.
Application No. AU2017366896 , "Second Examination Report", dated Sep. 15, 2022, 3 pages.
Application No. EP17875416.4 , "Notice of Decision to Grant", dated Oct. 13, 2022, 2 pages.
Application No. EP22204975.1, "Extended European Search Report", dated Feb. 13, 2023, 7 pages.
Application No. KR10-2019-7018964, "Office Action" and English translation, dated Dec. 26, 2022, 7 pages.

\* cited by examiner

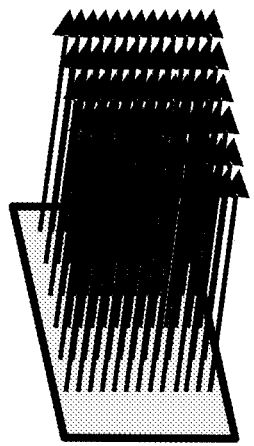
FIG. 4C
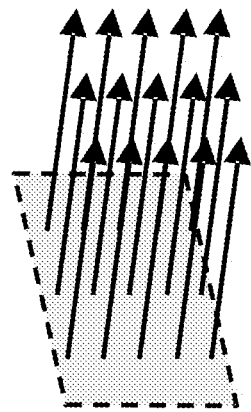
FIG. 4A
FIG. 4D
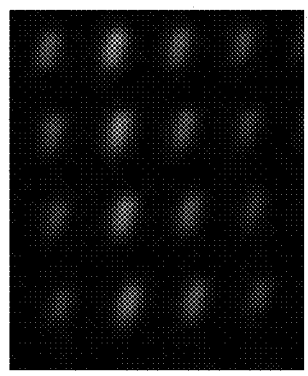
FIG. 4B

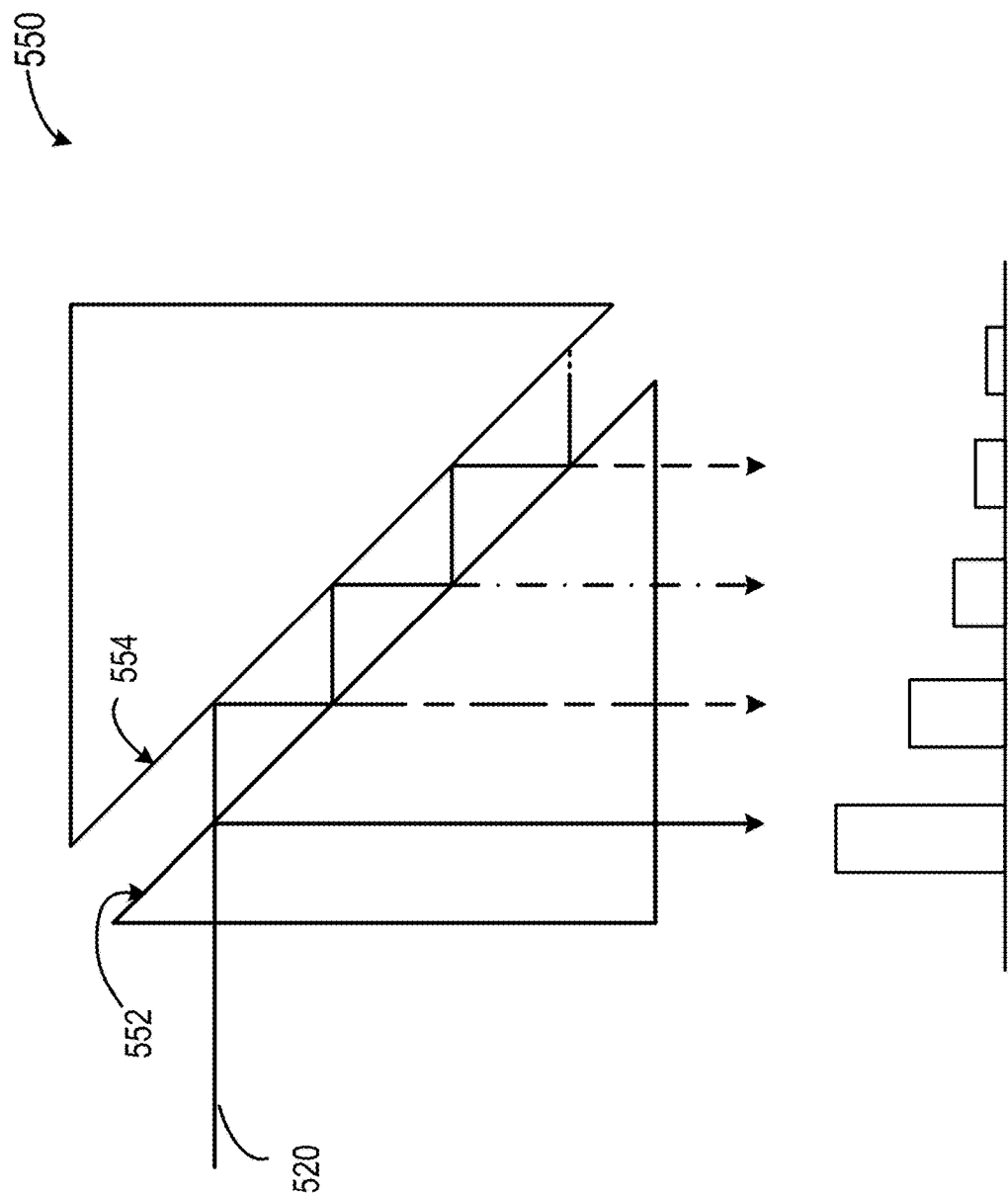

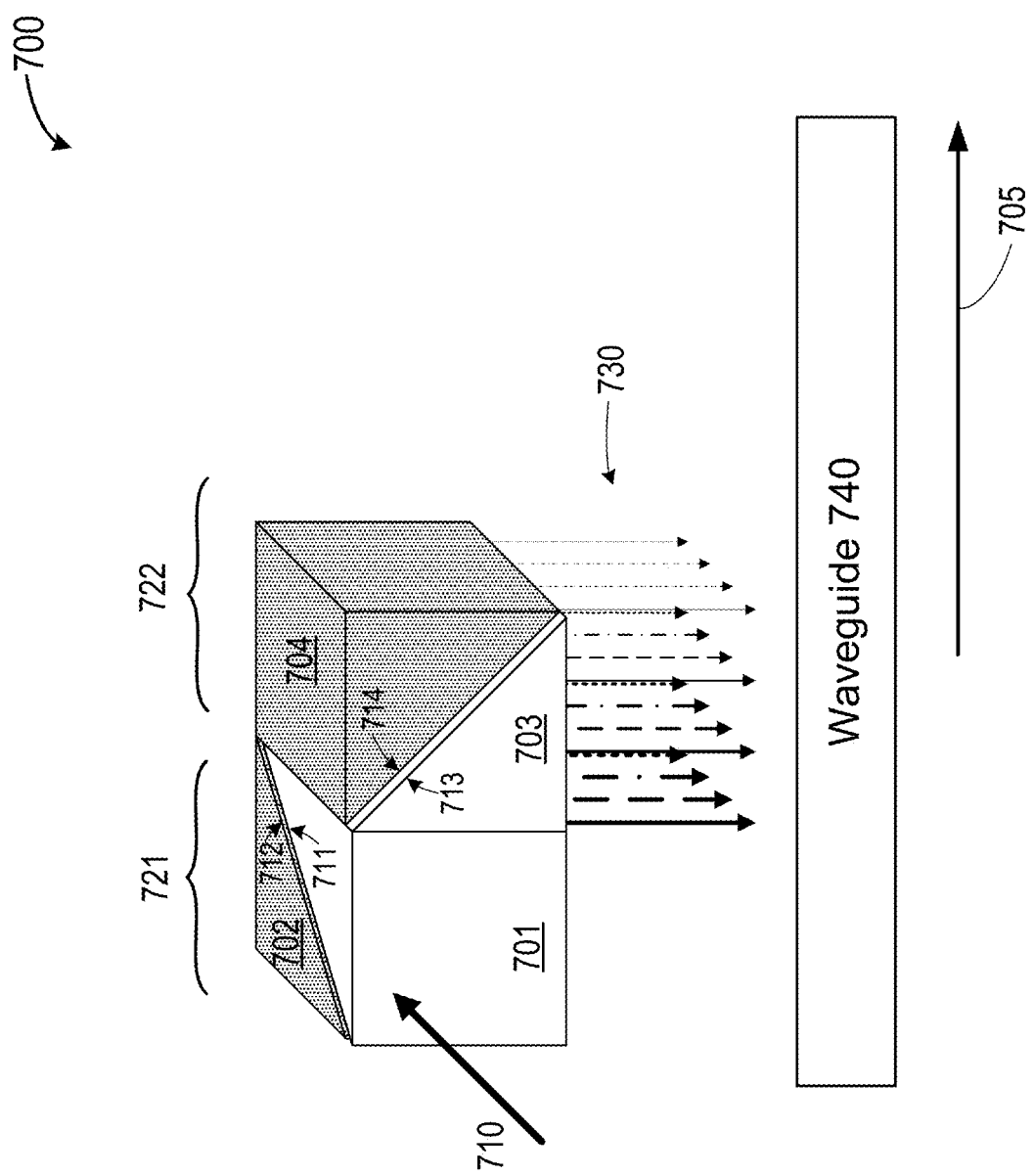

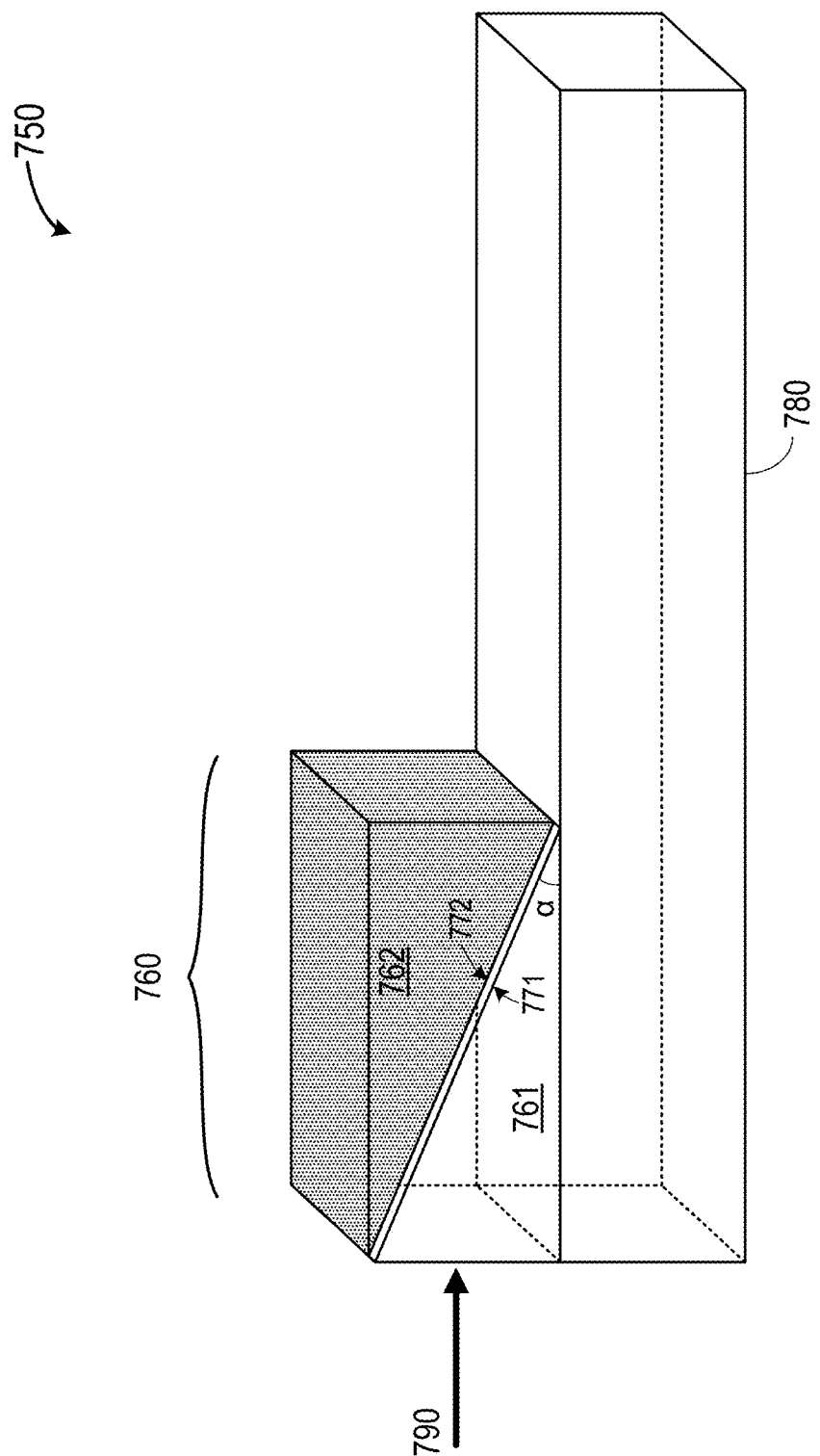

Wavelength = 635 nm

Wavelengths = 635 nm and 642 nm

METHOD AND SYSTEM FOR HIGH RESOLUTION DIGITIZED DISPLAY

CROSS-REFERENCES TO RELATED APPLICATIONS

This application is a divisional of U.S. patent application Ser. No. 15/826,315, filed on Nov. 29, 2017, U.S. Pat. No. 10,678,055, issued on Jun. 9, 2020, entitled "METHOD AND SYSTEM FOR HIGH RESOLUTION DIGITIZED DISPLAY," which is a non-provisional of and claims the benefit of and priority to U.S. Provisional Patent Application No. 62/428,510, filed on Nov. 30, 2016, entitled "METHOD AND SYSTEM FOR HIGH RESOLUTION DIGITIZED DISPLAY," which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. The image can be displayed using image frames or raster scanned images. In a scanning image display system, each of the light beams defines the pixels of the image. By scanning the mirrors in two orthogonal axes, a two-dimensional field of view can be created. The images can be projected onto the spectacle lens, which can include waveguide-based eyepieces and other optical elements, such as optical fibers. The image display systems can be mounted on each of the left and right sides of the glasses frames.

SUMMARY OF THE INVENTION

In a scanning image display system employing a scanning projector and a waveguide eyepiece, the image light beam undergoes total internal reflection (TIR) inside the waveguide eyepiece. At every reflection point where the image light beam reaches the output coupling element, a beamlet is out-coupled from the waveguide. If the density of these output light beamlets is low, i.e., the resolution of the output wavefront is low, then the image quality is poor. For example, the image at the depth plane when viewed through the viewing box suffers from a "screen door" artifact, or wavefront sparsity artifact. To the user, this looks like viewing an image through a screen door.

Some embodiments of the present invention provide a method and system for increasing dynamic digitized wavefront resolution, i.e., the density of output beamlets, by offsetting and replicating a collimated source light beam. The source can be copied, or replicated, or cloned to form multiple beamlets, and the beamlets are offset or displaced laterally such that there are effectively multiple collimated beam sources. This method provides a way of increasing beamlet density independent of the substrate thickness. It also accentuates the focal/accommodation cues the eyepiece delivers to the eye.

Alternatively, certain embodiments of the invention provide a method and system for increasing output beamlet density through wavelength diversity. A collimated incoming source light beam can include multiple input beams with different wavelengths in the vicinity of the nominal wavelength of a particular color. The incoming source light beam can be in-coupled into the eyepiece designed for the nominal wavelength. The input beamlets with multiple wavelengths diffract slightly differently when in-coupling into the waveguide and thus take different paths when they undergo total internal reflection in the waveguide, and couple out at distinct positions to produce multiple offset output beamlets.

According to some embodiments of the invention, an image display system includes a waveguide, and an optical device configured for receiving an incoming light beam and providing a plurality of input beamlets to the waveguide. Each input beamlet is derived from a portion of the incoming light beam, and the input beamlets are offset spatially from each other. The waveguide is configured for receiving the plurality of input beamlets using an input coupling element, propagating the plurality of input beamlets by total internal reflection (TIR), and outputting multiple groups of output beamlets using an output coupling element. Each group of output beamlets includes a portion of each of the plurality of input beamlets propagating in the waveguide by total internal reflection.

In some embodiments of the above image display system, the optical device includes a first surface and a second surface disposed in parallel and adjacent to each other. The first surface is partially reflective, and the second surface is substantially totally reflective. In some embodiments, the partially reflective first surface is configured to receive a light beam, and to reflect a first portion of the received light beam and to allow a second portion of the received light beam to pass through. The second surface is configured to reflect each light beam it receives from the first surface back to the first surface. For each light beam directed to the first surface from the second surface, the partially reflective first surface is configured to allow a portion to pass through toward the waveguide to form a new beamlet, and to reflect a remaining portion to the second surface.

In some embodiments of the above image display system, the optical device further includes a third surface and a fourth surface disposed in parallel and adjacent to each other, the third surface being partially reflective and the fourth surface being substantially totally reflective. The first and second surfaces are configured to receive the incoming light beam and provide a first plurality of beamlets. The third and fourth surfaces are configured to receive each of the first plurality of beamlets and provide multiple beamlets.

In some embodiments of the above image display system, the first surface and the second surface are configured to form an incoupling angle with a top surface of the waveguide such that no input grating in the waveguide is needed.

According to some embodiments of the invention, a method for displaying an image includes providing a waveguide, receiving an incoming light beam and providing a plurality of input beamlets to the waveguide, the input beamlets being offset spatially. The method also includes receiving the plurality of input beamlets in the waveguide, and propagating the plurality of input beamlets by total internal reflection (TIR) along different paths in the waveguide. The method further includes outputting multiple groups of output beamlets using an output coupling element. Each group of output beamlets includes a portion of each of the plurality of input light beams propagating in the waveguide by total internal reflection.

According to some embodiments of the invention, an alternative image display system includes a waveguide, and a light source for providing a collimated incoming light beam that includes a plurality of input light beams having different wavelengths. The waveguide is configured for in-coupling the plurality of input light beams into the waveguide using a wavelength-sensitive input coupling element, and propagating the plurality of input beams by total internal reflection (TIR), with each input light beam propagating along a different path in a different direction. The system is also configured for outputting multiple groups of output light beamlets using an output coupling element. Each group of output light beamlets includes a portion of each of the plurality of input light beams propagating in the waveguide by total internal reflection.

In an embodiment of the above system, wherein the waveguide is configured for a nominal wavelength of a color, and the plurality of input light beams have wavelengths in the vicinity of the nominal wavelength.

According to some embodiments of the invention, a method for displaying an image includes providing a waveguide, and providing a collimated incoming light beam. The collimated incoming light beam includes a plurality of input light beams having different wavelengths. The method also includes in-coupling the plurality of input light beams into a waveguide using a wavelength-sensitive input coupling element, and propagating the plurality of input beamlets by total internal reflection (TIR). Each beamlet is configured to propagate along a different path. The method also includes outputting multiple groups of output beamlets using an output coupling element. Each group of output beamlets includes a portion of each of the plurality of input light beams propagating in the waveguide by total internal reflection.

Additional features, benefits, and embodiments are described below in the detailed description, figures, and claims.

BRIEF DESCRIPTION OF THE DRAWINGS

FIGS. 4A-4D illustrate output beamlets wavefronts from an image display system according to some embodiments of the present invention;

FIGS. 5A-5D are simplified schematic diagrams illustrating image display systems according to some embodiments of the present invention;

FIG. 7A is a simplified schematic diagram illustrating another optical device for producing multiple output beamlets according to some embodiments of the present invention;

FIG. 7B is a simplified schematic diagram illustrating another optical device for producing multiple output beamlets according to some embodiments of the present invention

DETAILED DESCRIPTION OF SPECIFIC EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Figure 1:
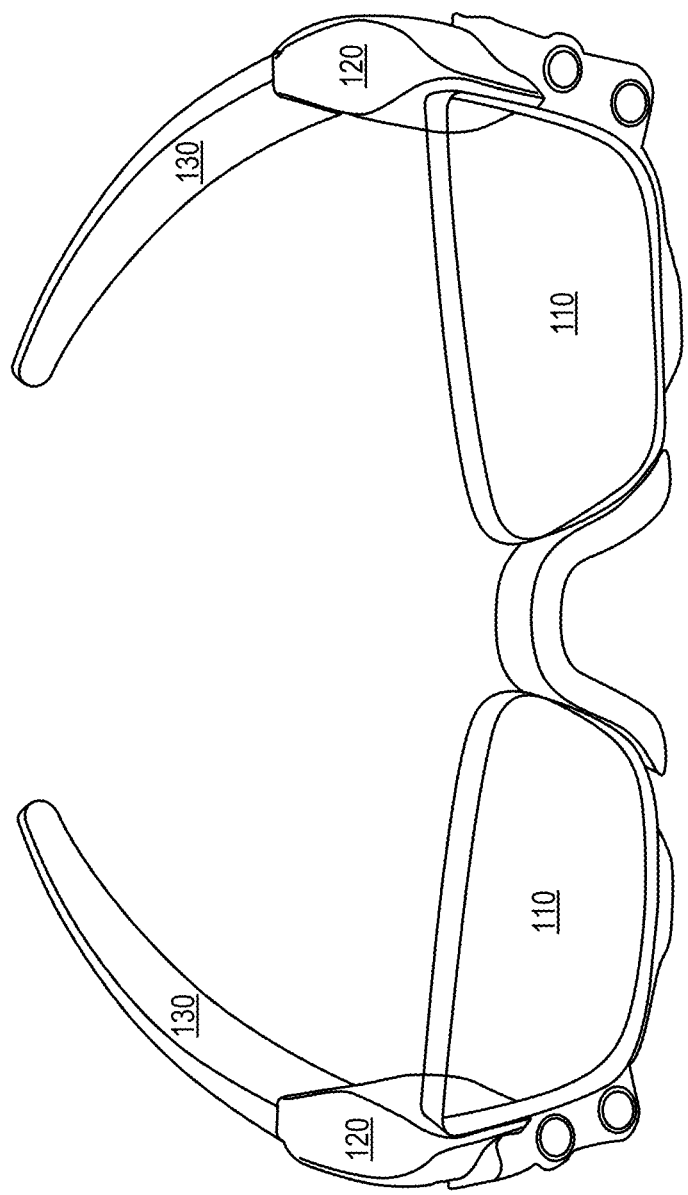
FIG. 1 is a simplified schematic diagram illustrating a perspective view of an exemplary wearable display device according to some embodiments of the present invention.

FIG. 1 is a simplified schematic diagram illustrating a perspective view of an exemplary wearable display device 100 according to some embodiments of the present invention. Wearable display device 100 includes main displays 110. In some embodiments, wearable display device 100 also includes projector assemblies 120, which are integrated into temple arms 130. Projector assemblies 120 can include projectors that shine light through diffractive optics that is then reflected into the eyes of a user through main displays 110.

Figure 2:
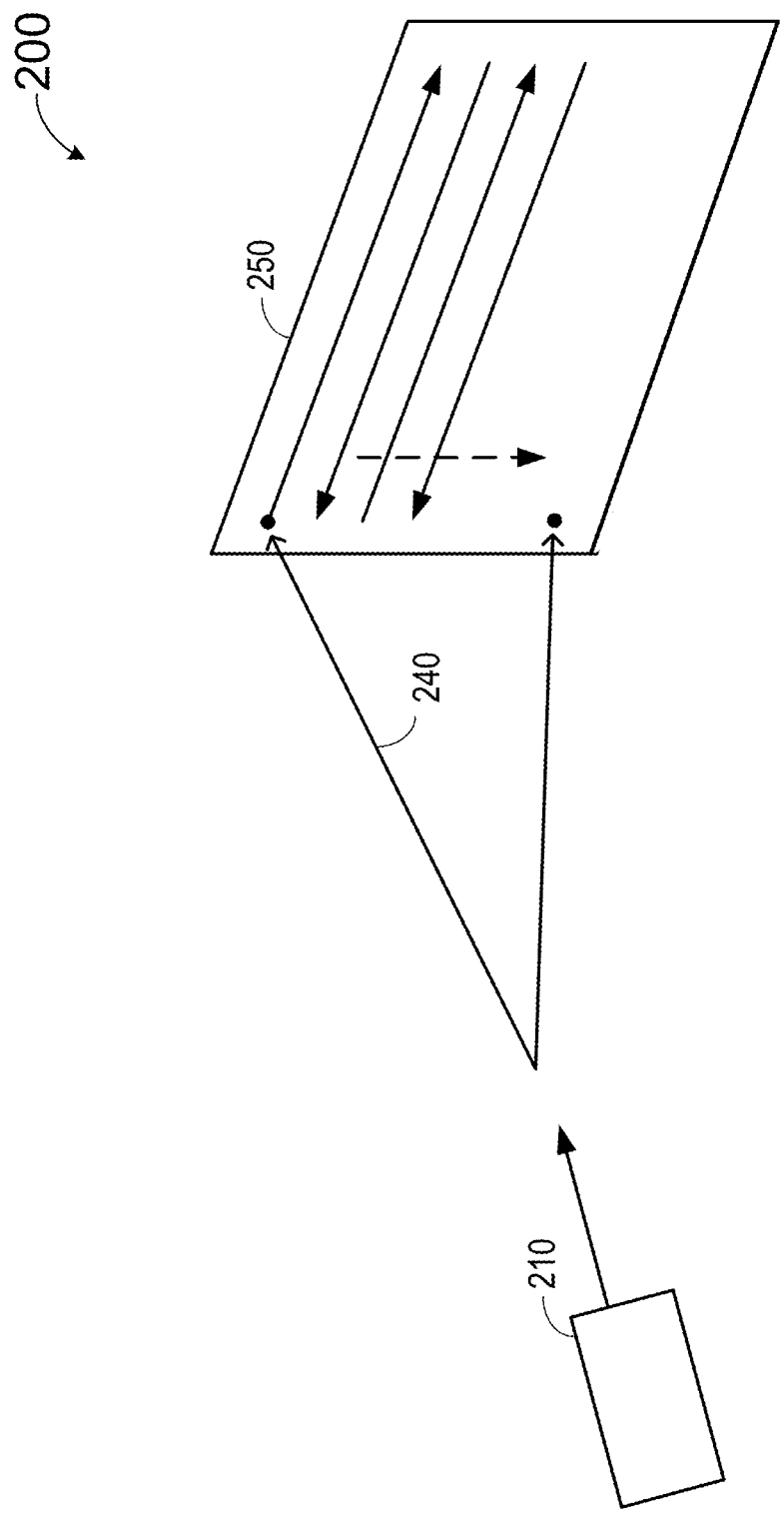
FIG. 2 is a simplified schematic diagram illustrating a scanning display system according to some embodiments of the present invention.

FIG. 2 is a simplified schematic diagram illustrating a scanning display system according to some embodiments of the present invention. In this example, scanning display system 200 can be part of an eyepiece, e. g., a waveguide based eyepiece, in a wearable device, such as wearable device 100 in FIG. 1. As shown in FIG. 2, scanning display system 200 includes a scanning projector 210 configured to emit light beams, e.g., beam 240, across a surface 250 to project an image. In some embodiments, scanning projector 210 can be part of projector assemblies 120 in wearable display device 100 in FIG. 1.

Figure 3:
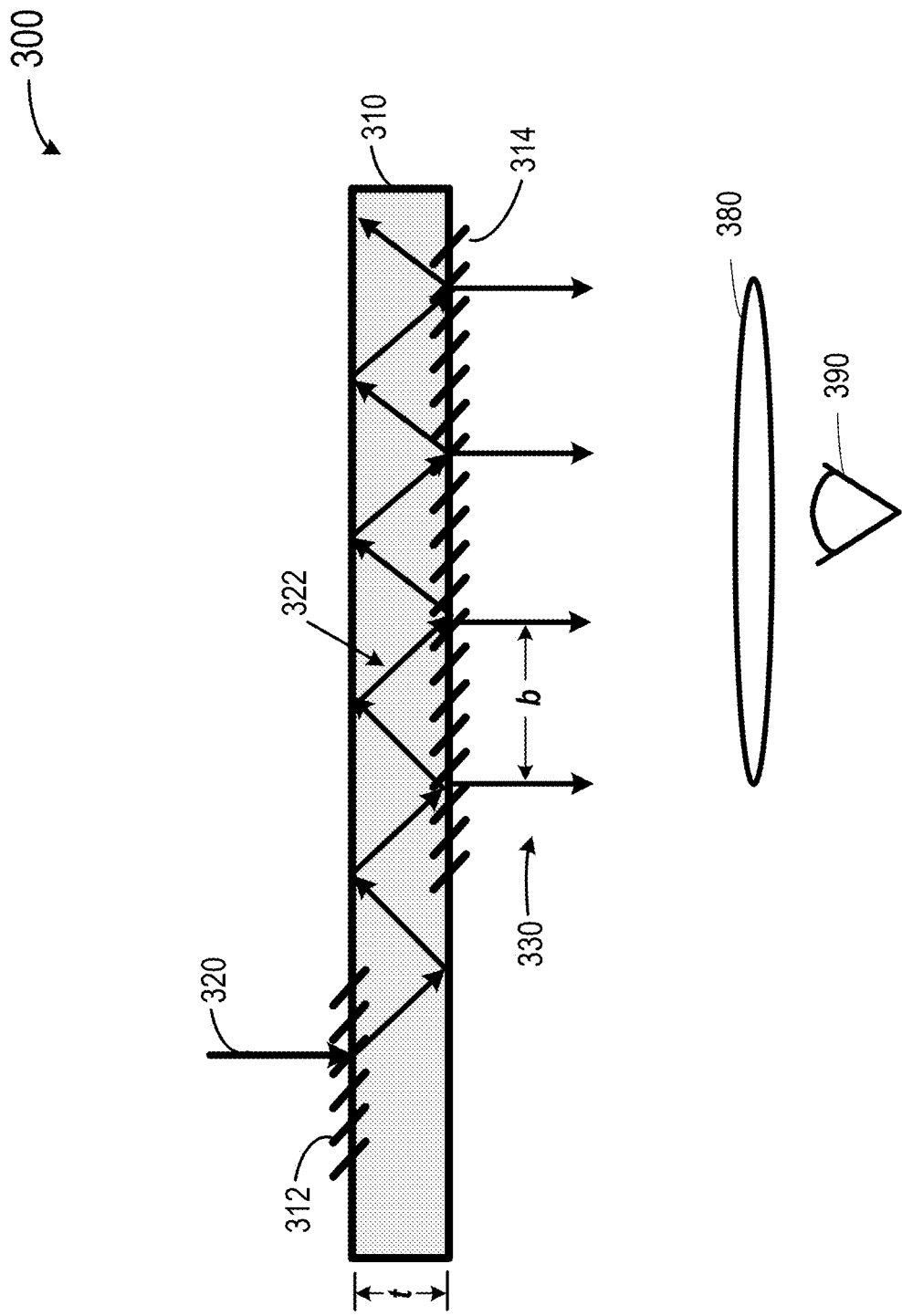
FIG. 3 is a simplified schematic diagram illustrating an image display system according to some embodiments of the present invention.

FIG. 3 is a simplified schematic diagram illustrating an image display system according to some embodiments of the present invention. FIG. 3 shows an image display system 300 that includes a side view of an eyepiece with a waveguide 310. A single collimated light beam 320 is directed toward waveguide 310. Light beam 320 can be provided by a scanning projector, such as a fiber scanner. Alternatively, light beam 320 can also be provided by a collimated light reflected off a scanning mirror. The image display system 300 further includes an input coupling element 312 configured to admit incident light for propagation by total internal reflection (TIR), as well as an output coupling element 314 configured to expand and outcouple light propagating along waveguide 310 by TIR toward a user's eye 390. Light beam 320 enters waveguide 310 at input coupling element 312 of waveguide 310 and undergoes total internal reflection (TIR) as shown by the arrows 322 inside waveguide 310. An array of beamlets 330 are out-coupled at output coupling element 314 in the exit pupil of waveguide 310. The array of output beamlets 330 forms a wavefront. In some embodiments, the image display system can also include optical elements 380, such as an eye lens, that directs the image to the user's eye 390. From the user's perspective, the array of output beamlets form a two-dimensional wavefront, as described further in FIGS. 4A-4D. The density of output beamlets is determined by the bounce spacing b, which in-turn is determined by substrate thickness t.

The input and output coupling elements 312 and 314 may be diffractive optical elements ("DOEs"), e.g., linear gratings, embedded within or imprinted upon waveguide 310. In some examples, the image display system 300 may further comprise an orthogonal pupil expander ("OPE") element (not shown) in addition to the output coupling element 314 to expand the light in both the X and Y directions. The output coupling element 314 may be slanted in the Z plane (i.e., normal to the X and Y directions) such that beamlets that are propagating through waveguide 300 will be deflected by 90° in the Z plane and toward the user's eye 390. The output coupling element 314 is also partially transparent and partially reflective along the light path (the Y axis), so that beamlets partially pass through the output coupling element 314 to form multiple beamlets spaced distance b apart from one another. More details about input coupling elements, output coupling elements, OPEs, and other DOEs are described in U.S. Utility patent application Ser. No. 14/555,585 and U.S. Utility patent application Ser. No. 14/726,424, the contents of which are incorporated herein by reference in their entirety.

FIGS. 4A-4D illustrate output beamlets wavefronts from an image display system according to some embodiments of the present invention. FIG. 4A illustrates a waveguide of low density output beamlets forming a sparse wavefront, also referred to as having a low resolution wavefront. In this case, the image at the depth plane when viewed through the viewing box suffers from a "screen door" artifact, also known as a wavefront sparsity artifact (which looks like viewing image through a screen door). FIG. 4B is an image illustrating the screen door effect caused by wavefront sparsity. This problem is especially severe for narrow in-coupled beams that are highly monochromatic (e.g., from a fiber scanner). For comparison, FIG. 4C illustrates a waveguide of a higher density of output beamlets, and FIG. 4D illustrates a waveguide of a much higher density of output beamlets. In a real world, the images can have essentially infinite resolution, which can offer strong depth cues.

As described above, a sparse wavefront causes undesired image artifacts in which the image appears as if it is being viewed through a screen door. A straightforward way to increase the beam density is to reduce the substrate thickness. As the rays bounce back and forth between the two surfaces of the waveguide for a given angle, the pitch or bounce spacing gets smaller as the two parallel surfaces are closer together, i.e., as thickness of waveguide decreases. However, below a certain thickness, further reducing thickness of substrate becomes prohibitively challenging and introduces other image quality and manufacturing issues. Embodiments of the invention provide techniques to increase wavefront resolution, independent of substrate thickness, as described below.

According to some embodiments of the present invention, in order to increase dynamic digitized wavefront resolution and mitigate screen door/wavefront sparsity artifacts, the incoming light beam can be copied, replicated, or cloned and offset or displaced laterally such that now there are effectively multiple collimated beam sources. This provides a way of increasing beamlet density independent of substrate thickness. It also accentuates the focal and accommodation cues the eyepiece delivers to the eye of a user.

Figure 5A:
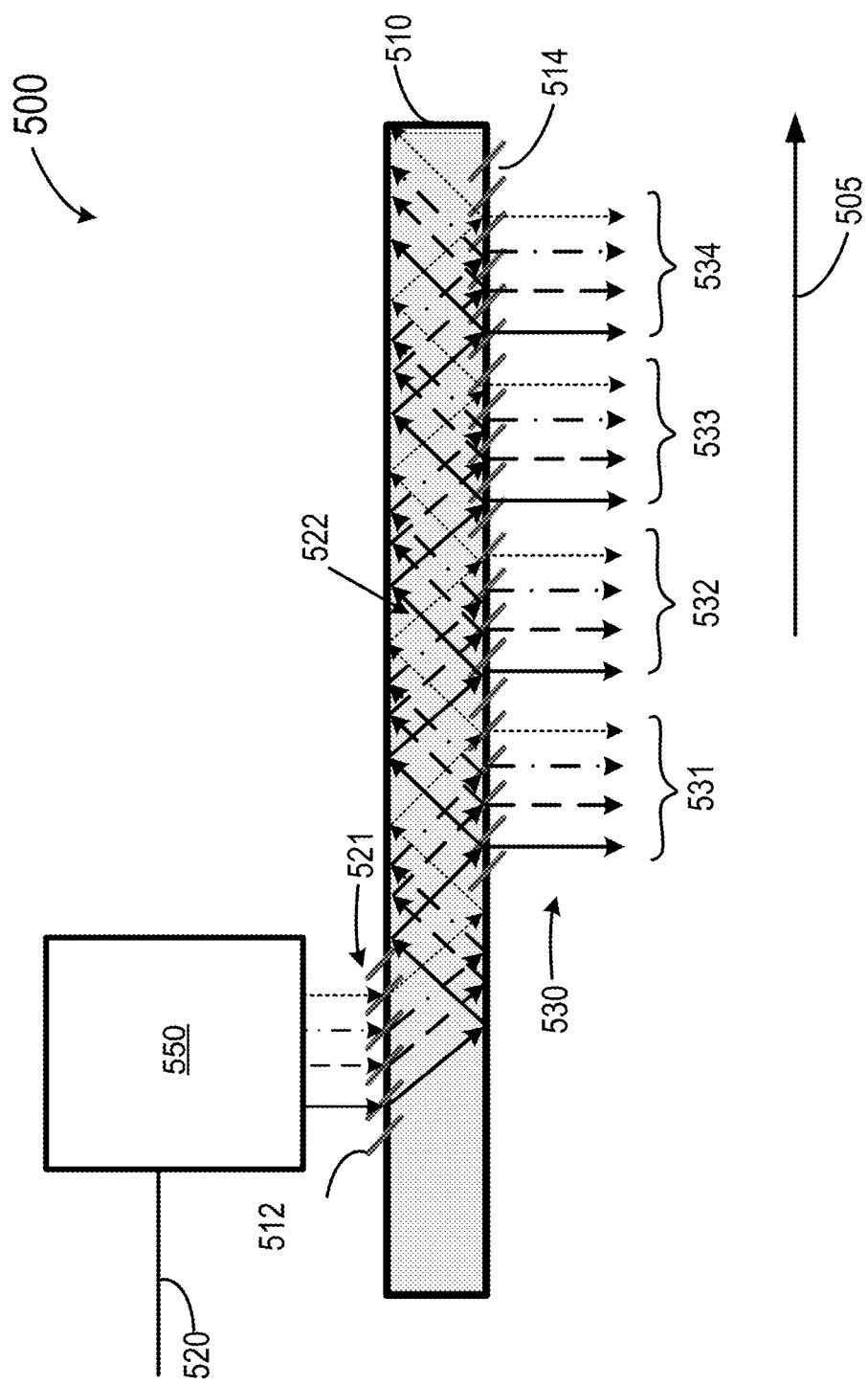

FIG. 5A is a simplified schematic diagram illustrating an image display system according to some embodiments of the present invention. As shown in FIG. 5A, an image display system 500 includes a waveguide 510 and an optical device 550 configured for receiving an incoming light beam 520 and providing a plurality of input beamlets 521 to the waveguide 510. Each image beamlet 521 is derived from a portion of incoming light beam 520. As shown in FIG. 5A, four source beamlets 521 are offset spatially, so that they are directed to different locations on the input coupling element 512 optically coupled to waveguide 510. Although only four source beamlets are illustrated in FIG. 5A, embodiments of the present invention are not limited to this particular number of source beamlets. In other embodiments, a reduced number of source beamlets are utilized, while in yet other embodiments, an increased number of source beamlets are utilized. As discussed in additional detail with respect to FIG. 5C, in some embodiments, the number of source beamlets is a function of the spatial parameters associated with optical device 550, additional details of which are described more fully with respect to FIGS. 5B-5D.

In FIG. 5A, waveguide 510 is configured for receiving the plurality of input beamlets 521 at an input coupling element 512, e. g., an input coupling grating. In the illustrated embodiment, the source beamlets are incident on the input coupling element 512 at normal incidence. However, this is not required by the present invention and operation at other angles of incidence are included with the scope of the present invention. Source beamlets 521 diffract upon passing through input coupling element 512 at a non-normal angle of propagation inside waveguide 510.

After passing through and diffracting from input coupling element 512, input beamlets 521 propagate along waveguide 510 by total internal reflection (TIR), with the reflected beams shown as 522 in FIG. 5A making multiple passes as they propagate from the end of waveguide 510 adjacent the input coupling element 512 toward the right end of output coupling element 514 optically coupled to the lower surface of waveguide 510. The waveguide 510 can be characterized by a longitudinal axis aligned with the direction of propagation of light along the waveguide. In FIG. 5A, the longitudinal axis 505 is aligned with the top and bottom surfaces of the waveguide and is parallel to the direction of propagation of incoming light beam 520.

Figure 5B:
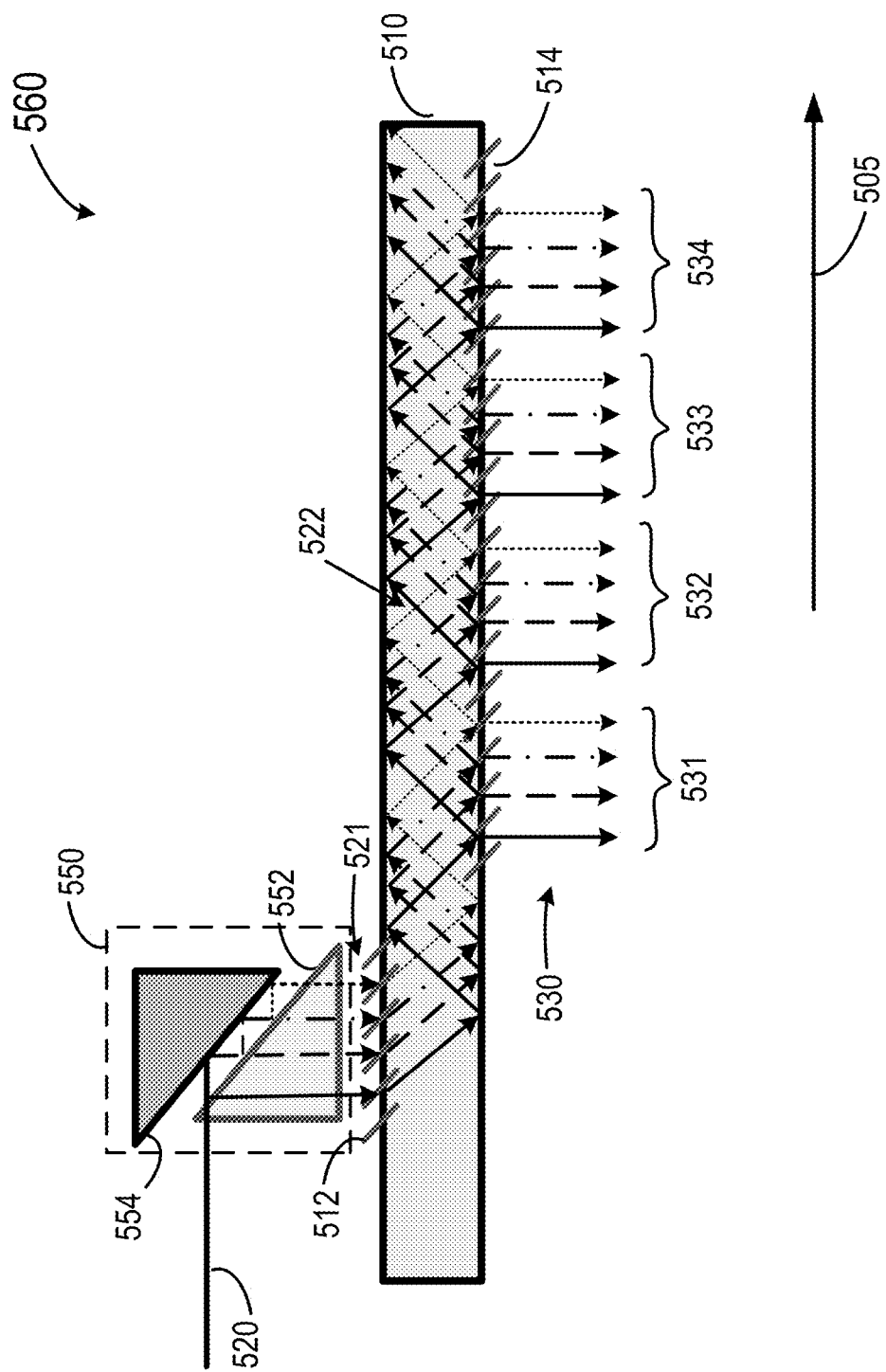

In the waveguide, the plurality of input beamlets propagates along the waveguide by total internal reflection (TIR), in which a beamlet is totally reflected back internally, when it reaches a surface of the waveguide. The phenomena occurs if the angle of incident of the beamlet is greater than a critical angle of the waveguide. In FIG. 5B, each of the plurality of beamlets 521 is represented by a different solid or dashed line pattern, and each of the plurality of input beamlets traverses a different path in the waveguide.

Waveguide 510 also is configured to output multiple groups of output beamlets 530 using an output coupling element 514, e.g., an output coupling grating. Output coupling element 514 is coupled to waveguide 510 at a surface of the waveguide. Output coupling element 514 causes the beamlets 522 in the waveguide to be partially refracted at the surface to exit the waveguide and partially reflected back into the waveguide. In FIG. 5A, when the beamlets inside the waveguide first reach output coupling element 514, a portion of each beamlet is refracted and exits the waveguide to form a first group of output beamlets 531. The remaining portions of the beamlets continue to propagate by total internal reflection and form subsequent groups of output beamlets 532 to 534 when they exit the waveguide at different positions along the longitudinal axis. Therefore, each group of output beamlets includes a portion of each of the plurality of input light beamlets propagating in the waveguide by total internal reflection. For example, four groups of output beamlets, 531, 532, 533, and 534, are shown in FIG. 5A. Each group of output beamlets includes a portion of each of the plurality of input beamlets 521 propagating in the waveguide by total internal reflection.

FIG. 5B is a simplified schematic diagram illustrating an image display system according to some embodiments of the present invention. As shown in FIG. 5B, an image display system 560 is similar to image display system 500 in FIG. 5A, but with optical device 550 replaced with a specific implementation. In this example, optical device 550 includes a first surface 552 and a second surface 554 disposed in parallel, adjacent to each other, and at an oblique angle, e.g., at a 45° angle, to one or more surfaces of waveguide 510, input coupling element 512, and/or output coupling element 514. The first surface 552 is partially reflective, and the second surface 554 is substantially totally reflective. The operation of optical device 550 is explained further with reference to a magnified view of optical device 550 as shown in FIG. 5C.

Figure 5C:
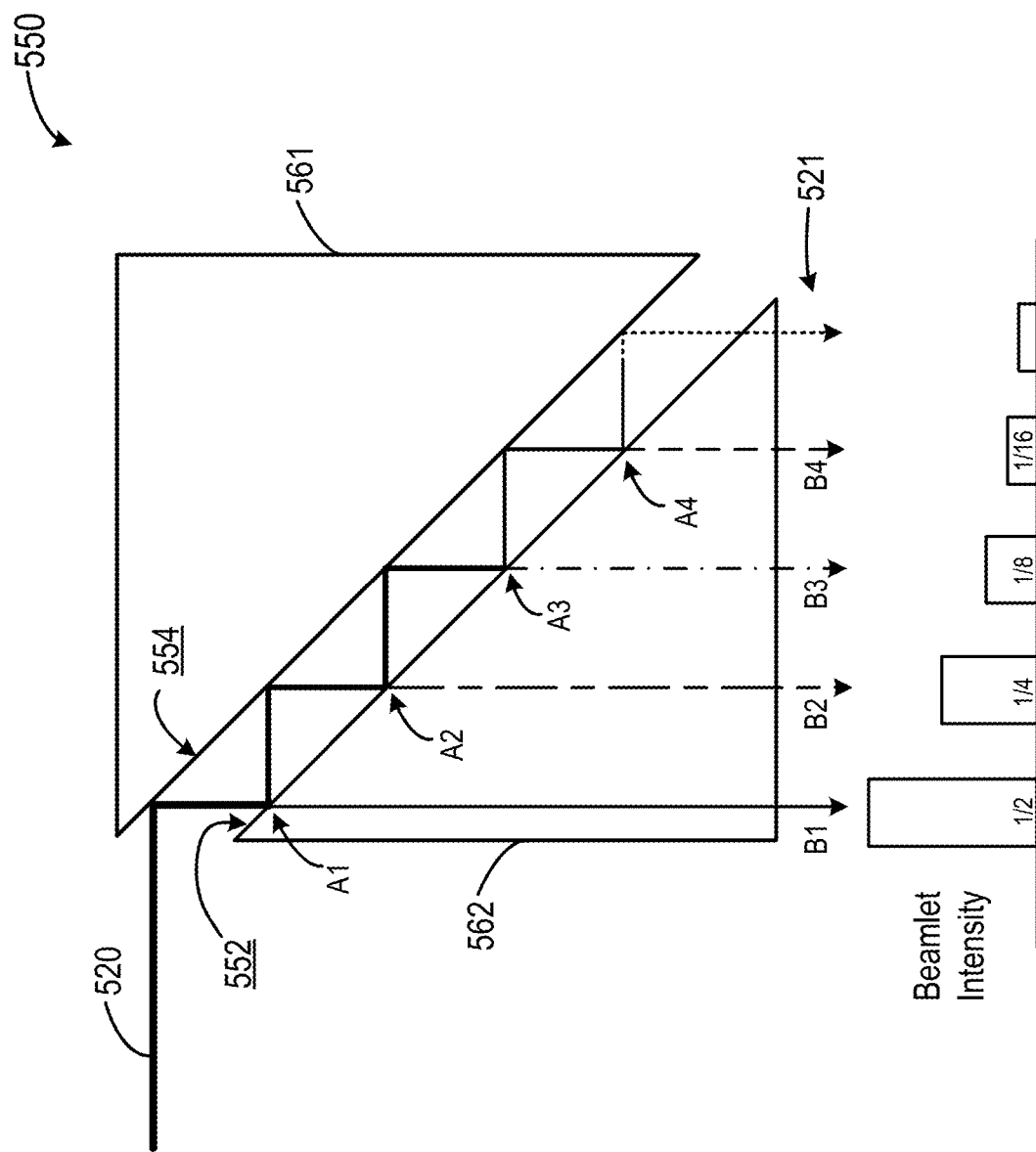

FIG. 5C is a simplified schematic diagram illustrating the optical device 550 in the image display system of FIG. 5B according to some embodiments of the present invention. In FIG. 5C, the partially reflective first surface 552 and the reflective second surface 554 are provided by two prisms 562 and 561, respectively, which are right triangular and comparable in size. As such, in some examples the optical device 550 may be cuboidal or quasi-cuboidal in shape. An incoming light beam 520 enters optical device 550 and provides a plurality of image beamlets 521 that are offset spatially. Each image beamlet 521 is derived from a portion of incoming light beam 520. In this example, incoming light beam 520 is reflected by the reflective second surface 554 toward the partially reflective surface 552 at point A1. The partially reflective first surface 552 reflects a first portion of the incoming light beam to the second surface, and allows a second portion of the incoming light beam to transmit through the prism to form a first beamlet B1. Similarly, the light beam reflected from the second surface 554 to reach point A2 of the first surface 552 is partially reflected toward the second surface 554, and partially passes through prism 562 to form a second beamlet B2. In a similar manner, part of the light beam reaching point A3 forms a third beamlet B3, and part of the light beam reaching point A4 forms a fourth beamlet B4. For illustration purposes, in the example of FIG. 5C, the reflectivity of the partially reflective surface 552 is presumed to be 50%. As a result, the intensities of light beamlets B1, B2, B3, and B4 are ½, ¼, ⅛, and ¹⁄₁₆, respectively, of the intensity of incoming light beam 520, as shown in FIG. 5C.

The intensity distribution in FIG. 5C is derived based on the partially reflective surface 552 having a reflectivity of 50%. In some embodiments, the reflectivity can be varied to lead to different beamlet intensity distributions. In some embodiments, the reflectivity along the partially reflective surface 552 can be varied to achieve a desired intensity distribution.

The partially reflective first surface 552 can include a partially reflective coating, such as one composed of a metal, e.g., gold, aluminum, silver, nickel-chromium, chromium, etc., a dielectric, e.g., oxides, fluorides, sulfides, etc., a semiconductor, e.g., silicon, germanium, etc., and/or a glue or adhesive with reflective properties, which can be applied to prism 562 by way of any suitable process, e.g., physical vapor deposition ("PVD"), ion-assisted deposition ("IAD"), ion beam sputtering ("IBS"), etc. The ratio of reflection to transmission of such a coating may be selected or determined based at least in part upon the thickness of the coating, or the coating may have a plurality of small perforations to control the ratio of reflection to transmission. It follows that the output coupling element 514 may include a partially reflective coating composed of one or more of the abovementioned materials. The reflective second surface 554 can include a reflective coating, which may also be composed of one or more of the abovementioned materials, but thick enough so as to sufficiently render the second surface 554 completely or almost completely reflective. In some embodiments, surfaces 552 and 554 of prisms 562 and 561, respectively, can be directly or indirectly bonded together with glue or adhesive, such as a glue or adhesive with reflective properties as described above.

In some embodiments, the number of input beamlets can be changed by varying the spacing between the partially reflective surface 552 and the reflective surface 554. For example, reducing the spacing between the two surfaces can lead to an increased number of reflections between the two surfaces, generating more input beamlets. In FIGS. 5A-5C, the partially reflected first surface 552 and the reflective second surface 554 are represented by planar surfaces. In other embodiments, the partially reflected first surface and the reflective second surface can have different shapes, for example, parabolic, spherical, or other shapes.

In FIG. 5C, incoming light beam 520 reaches the second surface 554 and is reflected toward the first surface 552. Alternatively, if the incoming light beam 520 enters prism 562 before reaching totally reflective surface 554, as shown in FIG. 5D, then the partially reflective first surface 552 is configured to reflect a first portion of the incoming light beam toward the waveguide to form a first beamlet, and to allow a second portion of the incoming light beam to transmit to the second surface. Subsequent beamlets are formed in the manner described above in connection with FIG. 5C.

Figure 6B:
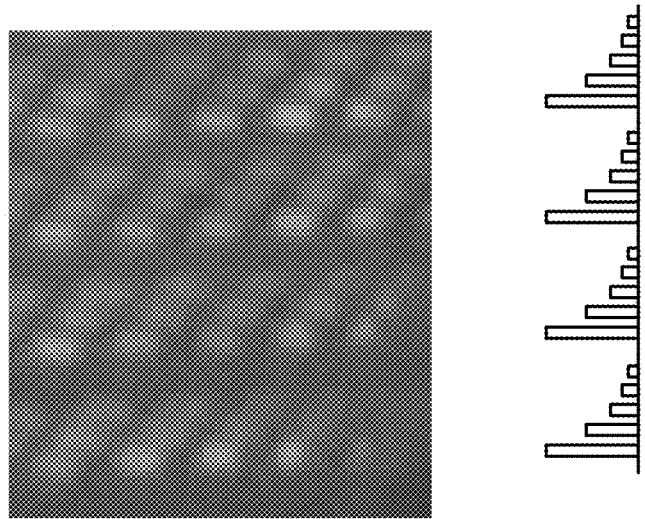
FIGS. 6A and 6B are images illustrating the reduction of the screen door effect by the optical device described above according to some embodiments of the present invention.
Figure 6A:
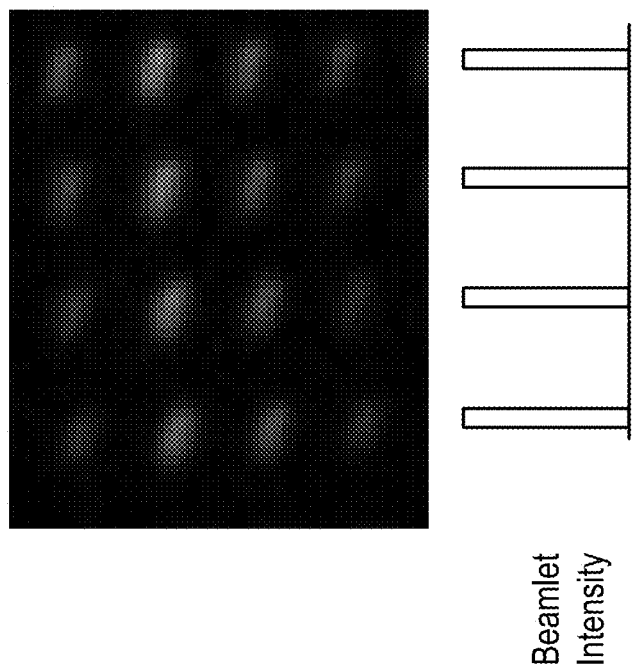

FIGS. 6A and 6B are images illustrating the reduction of the screen door effect by the optical device described above according to some embodiments of the present invention. FIG. 6A is the same as FIG. 4B and illustrates the screen door effect caused by wavefront sparsity. FIG. 6B is an image illustrating the reduction of screen door effect by providing multiple beamlets from a single incoming light beam. The beamlet intensity is plotted below the images. In FIG. 6B, the beamlet intensity is based on FIG. 5C where the partial reflectivity mirror is assumed to have a reflectivity of 0.5. In embodiments of the invention, more improvements can be achieved by varying beamlet intensity distribution and increasing the number of beamlets derived from the incoming light beam. These improvements can be obtained by optimizing the shape and reflectivity of the reflective and partially reflective surfaces.

Figure 6C:
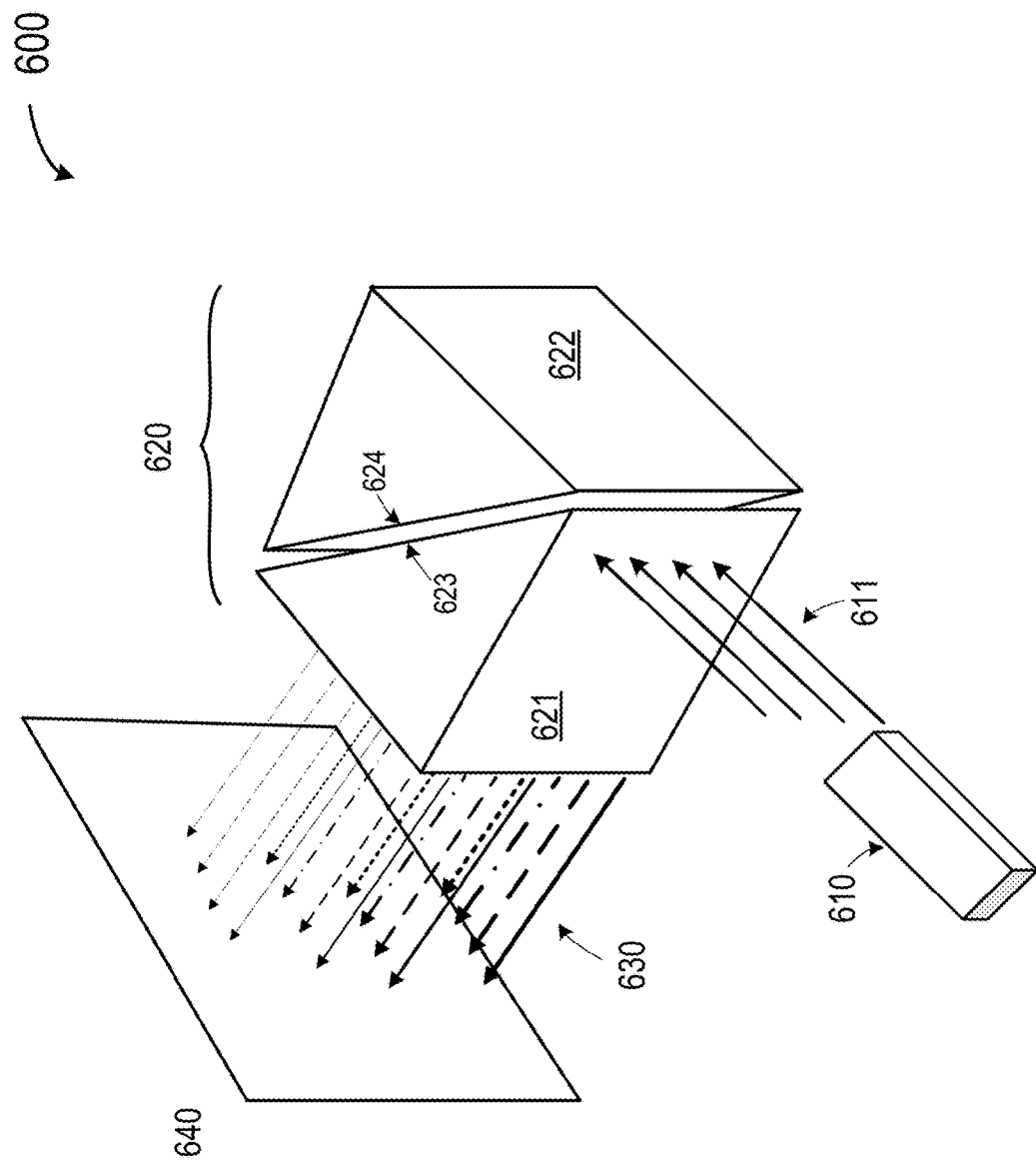
FIG. 6C is a simplified drawing illustrating an experimental system for verifying the function of the display system according to an embodiment of the present invention.

FIG. 6C is a simplified drawing illustrating an experimental system for verifying the function of the display system described above. FIG. 6C shows a single collimated light source 610 from a fiber scanner and an optical device 620. Collimated light source 610 provides a plurality of collimated light beams 611. Optical device 620 includes two prisms 621 and 622, respectively, providing a partially reflective mirror 623 and a 100% reflective mirror 624. A certain transverse distance is maintained between the two parallel planes 623 and 624 from the two mirrors. Optical device 620 receives each of the plurality of collimated light beams 611 and produces multiple beamlets 630 that are projected onto an image sensor 640. FIGS. 6A and 6B are examples of images that can be provided by image sensor 640.

FIG. 7A is a simplified schematic diagram illustrating an optical device for producing multiple output beamlets according to some embodiments of the present invention. As shown in FIG. 7A, optical device 700 can be used as optical device 550 in the image display system of FIGS. 5A and 5B. Optical device 700 can include multiple "optical devices," each of which can be similar to optical device 550 in optical device 700. The multiple optical devices can be positioned in a cascading arrangement to provide additional beam cloning. As shown in FIG. 7A, prisms 701 and 702 form a first optical device 721, and prisms 703 and 704 form a second optical device 722. Both first optical device 721 and second optical device 722 are similar to optical device 550, but are oriented in different directions.

In FIG. 7A, optical device 721 includes prism 701 with a partially reflected surface 711 and prism 702 with a reflective surface 712. Similarly, optical device 722 includes prism 703 with a partially reflected surface 713 and prism 704 with a reflective surface 714. In some examples the optical devices can be oriented differently from one another such that a 2D array of cloned beamlets can be in-coupled into a waveguide. For example, an incoming light beam 710 enters optical device 721, which provides a plurality of image beamlets (not shown) that are offset spatially and traverse along a longitudinal direction along the waveguide. Each of the beamlets from optical device 721 entering optical device 722 can provide a plurality of beamlets that forms a portion of a plurality of input beamlets 730 that are directed to the waveguide. As a result, a 2D array of cloned beamlets can be in-coupled into a waveguide.

As an example, optical device 721 can be characterized by a cloning factor or multiplicity factor of m, i.e., a single input beam can produce m output beamlets, and optical device 722 can be characterized by a cloning factor or multiplicity factor of n. Then, the cascaded optical device 700 can have a cloning factor or multiplicity factor of m×n. As shown in FIGS. 5A and 5B, each input beamlet entering the waveguide produces multiple output beamlets emitting from the waveguide. The wavefront density can be greatly increased. In some embodiments, more than two optical devices can be cascaded to further increase the wavefront density.

Although described primarily within the context of triangular prisms, particularly right triangular or "Porro" prisms, it is to be understood that one or more of the prisms described herein may take on other geometries. For instance, a single Porro-Abbe prism can be implemented with four triangular prisms with totally reflective surfaces that are each arranged parallel to a respective one of the Porro-Abbe prism's four hypotenuse sides, so as to provide the beam cloning functionality of four optical devices in a cascading configuration. Other geometries can include any of a variety of other polyhedral geometries, such as "Amici" or Amici roof prism geometries, parallelogram prism geometries, trapezoidal prism geometries, pyramidal or semi-pyramidal prism geometries, e.g., tetrahedral prism geometries, diagonal slices of cuboidal or triangular prism geometries, and the like.

FIG. 7B is a simplified schematic diagram illustrating another optical device for producing multiple output beamlets according to some embodiments of the present invention. In these embodiments, the bottom prism of the optical device can provide incoupling functionality. As shown in FIG. 7B, an optical system 750 includes an optical device 760 for producing multiple beamlets from an input light beam and a waveguide 780 for receiving the multiple beamlets. Optical device 760 includes a first prism 761 with a partially reflected surface 771 and a second prism 772 with a reflective surface 772. The prisms can take on a geometry other than a 45°-45°-90° triangular prism, such that the prisms reflect an incoming light 790 into the waveguide 780 at an desired oblique incoupling angle, e.g., different from a 90° angle. As shown in FIG. 7B, surfaces 771 and 772 of the prisms form an angle α of less than 45° with at top surface of waveguide 780, which can lead the beamlets to enter the waveguide at a slanted incident angle. As such, in some of these embodiments, the incoupling grating may not be necessary. Other geometries/configurations for providing incoupling functionality by way of the optical device 760 and/or waveguide 780 can also be used. For example, surfaces 771 and 772 of the prisms form an angle α of greater than 45° with at top surface of waveguide 780. In another example, an input coupling element, e.g., grating, can be provided on the surface of one or both legs, e.g., the non-hypotenuse sides, of the first prism 761 (which is right triangular in shape). In yet another example, the first prism 761 can take on a geometry other than a triangular prism, such as that of a parallelogram. In such an example, the first prism 761 may be arranged so as to incouple light into a side surface of waveguide 780, as opposed to a top surface of waveguide 780. In some examples, the first prism 761 may be effectively integral to waveguide 780.

Figure 8:
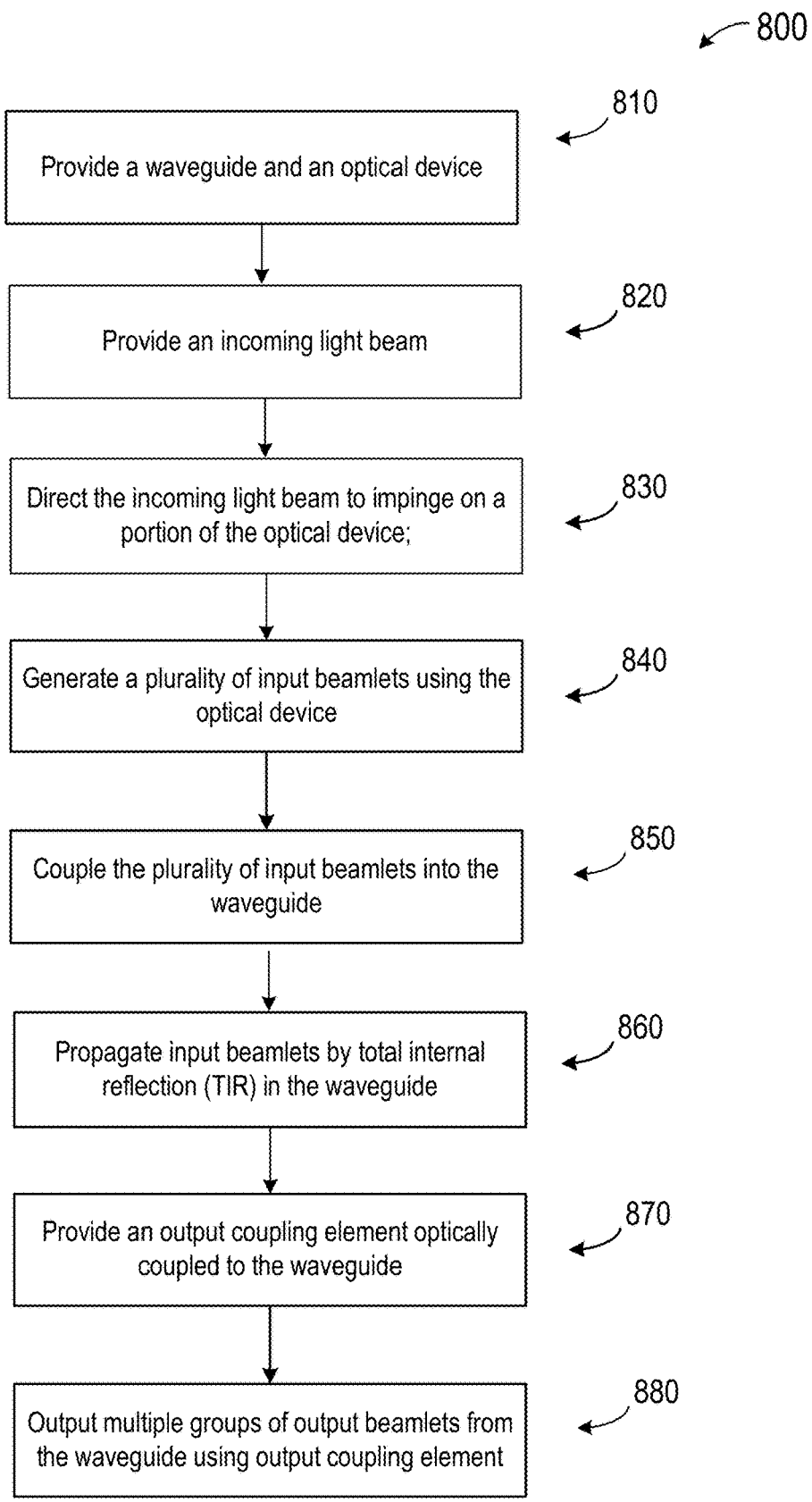
FIG. 8 is a simplified flowchart illustrating a method for displaying an image with reduced wavefront sparsity effect or screen door effect according to an embodiment of the present invention.

FIG. 8 is a simplified flowchart illustrating a method for displaying an image with reduced wavefront sparsity effect or screen door effect according to an embodiment of the present invention. The method 800 for displaying an image includes providing a waveguide and an optical device (810) and receiving an incoming light beam (820). An examples optical device is shown in FIGS. 5B and 5C, in which optical device 550 includes a first surface 552 and a second surface 554 disposed in parallel and adjacent to each other. In this example, the first surface 552 is partially reflective, and the second surface 554 is substantially totally reflective. In some embodiments, the incoming light beam can be provided using a fiber scanner.

The method also includes directing the incoming light beam to impinge on a portion of the optical device (830) and generating a plurality of input beamlets using the optical device (840). Referring to FIG. 5C, incoming light beam 520 is directed to the second surface 554 of optical device 550 and is reflected toward the first surface 552, where the light is partially reflected back toward the second surface 554. The other portion of the light is transmitted through prism 562 and exits prism 562 as a first input beamlet B1. Subsequent input beamlets B2, B3, and B4 are generated in a similar manner. The plurality of input beamlets are offset spatially with respect to each other. As shown in FIG. 5C, input beamlets B1 through B4 exit prism 562 at increasing distances from the left side of prism 562 such that each of the input beamlets is positioned to impinge on the input coupling element at a different longitudinal positions arrayed along the longitudinal axis.

The method also includes coupling the plurality of input beamlets into the waveguide (850) and propagating the plurality of input beamlets propagate along the waveguide by total internal reflection (860). Referring to FIG. 5B, input beamlets 521 are coupled into waveguide 510 through input coupling element 512. In the waveguide, the plurality of input beamlets propagates along the waveguide by total internal reflection (TIR). In TIR, a beamlet is totally reflected back internally, when it reaches a surface of the waveguide. In FIG. 5B, each of the plurality of beamlets 521 is represented by a different solid or dashed line pattern, collectively labeled 522, and each of the plurality of input beamlets traverses a different path in the waveguide.

Method 800 further includes providing an output coupling element optically coupled to the waveguide (870) and outputting multiple groups of output beamlets using the output coupling element (880). As shown in FIG. 5B, output coupling element 514 is coupled to waveguide 510 at an interface between the waveguide and ambient air. Output coupling element 514 causes the beamlets 522 in the waveguide to be partially refracted at the boundary surface to exit the waveguide, and partially reflected back into the waveguide. In FIG. 5B, when the beamlets inside the waveguide first reach exit coupling element 514, a portion of each beamlet is refracted and exits the waveguide to form a first group of output beamlets 531. The remaining portions of the beamlets continue to propagate by total internal reflection and form subsequent groups of output beamlets 532 to 534 at different positions along the longitudinal axis. Therefore, each group of output beamlets includes a portion of each of the plurality of input light beamlets propagating in the waveguide by total internal reflection.

Examples of an image display system that implements method 800 are described above in connection with FIGS. 3-7. In some embodiments, the above method includes providing an optical device for receiving an incoming light beam and providing a plurality of input beamlets that are offset spatially. The plurality of input beamlets can be directed to a waveguide to generate increased number of output beamlets, which can increase the wavefront density and reduce the screen door effect. In some embodiments, the method can also include focusing the multiple groups of output light beamlets using an eye lens.

It should be appreciated that the specific steps illustrated in FIG. 8 provide a particular method for displaying an image with reduced wavefront sparsity effect or screen door effect according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
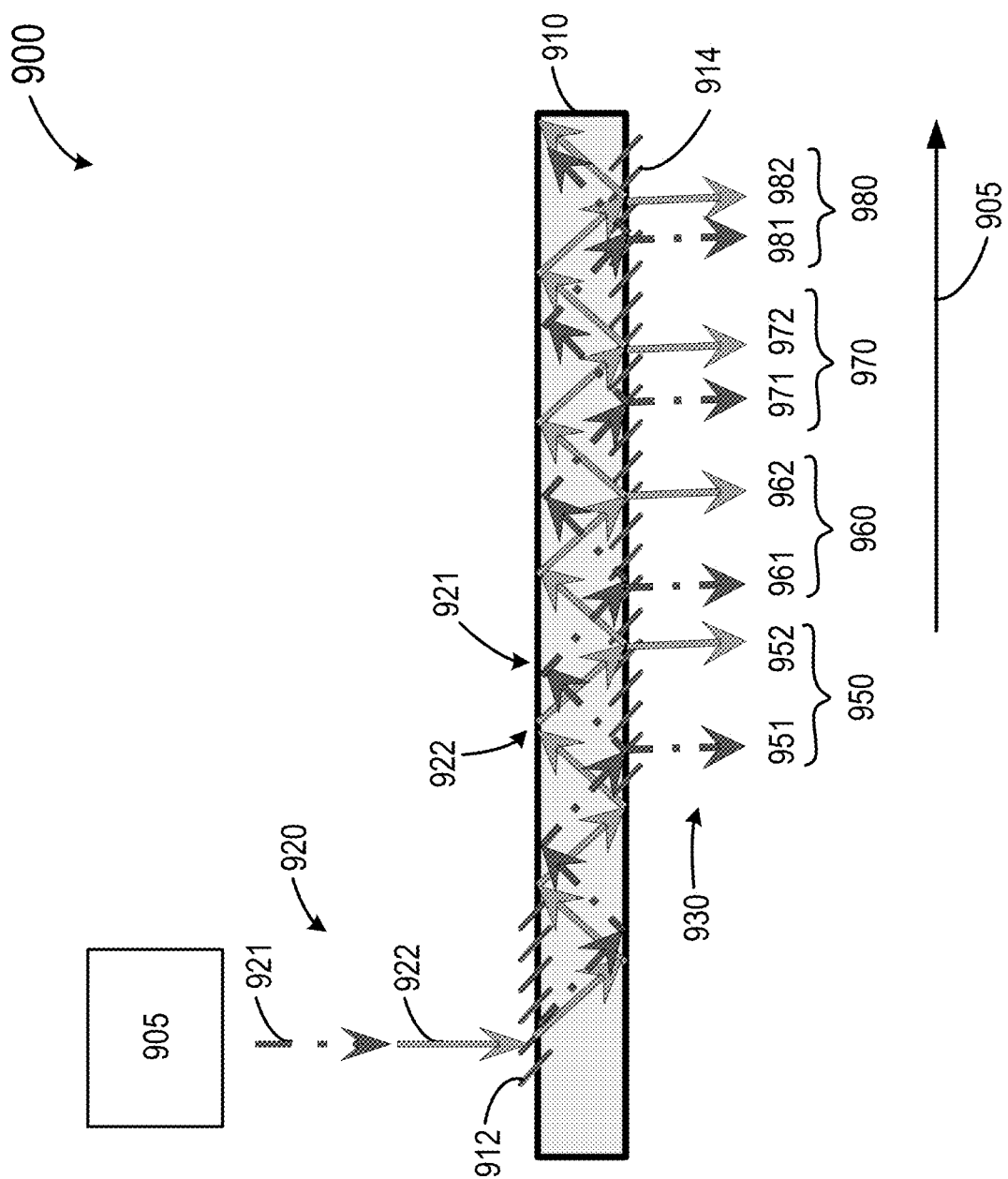
FIG. 9 is a simplified schematic diagram illustrating an image display system according to an alternative embodiment of the present invention.

FIG. 9 is a simplified schematic diagram illustrating an image display system according to an alternative embodiment of the present invention. As shown in FIG. 9, an image display system 900 includes a waveguide 910 configured for receiving an incoming light beam and a light source 905 for providing a collimated incoming light beam 920. Collimated incoming light beam 920 includes a plurality of input light beams having different wavelengths. As an example, in FIG. 9, collimated incoming light beam 920 includes a first light beam 921 having a first wavelength and a second light beam 922 having a second wavelength.

As shown in FIG. 9, two input light beams 921 and 922 with slightly different wavelengths are included in collimated incoming light beam 920, so that they are diffracted slightly differently in the input coupling element 912 and enter waveguide 910 at slightly different angles of incidence. Although only two input light beams are illustrated in FIG. 9, embodiments of the present invention are not limited to this particular number of input light beams. In other embodiments, an increased number of input light beams are utilized. As can be seen in FIG. 9, increasing the number of input light beams can increase the number of output beamlets and further increase wavefront density of the output image.

In some embodiments, the different wavelengths are selected from a range of wavelengths centered around a nominal wavelength for which a waveguide eyepiece is designed. In an embodiment, for a red image signal, lasers of wavelengths 630 nm, 635 nm, and 640 nm can be in-coupled into a waveguide eyepiece nominally designed for 635 nm. In another embodiment, a single collimated incoming light beam can include component light beams having wavelengths of 635 nm and 642 nm. In some embodiments, the plurality of input light beams can have wavelengths that span a spectrum width of about 5 nm, 10 nm, or 20 nm in the vicinity of a nominal wavelength. In some embodiments, the plurality of input light beams can have wavelengths that span a spectrum width of about 30 nm, or 50 nm in the vicinity of a nominal wavelength. In these embodiments, the plurality of input light beams can be used to generate increased number of output beamlets that can increase the wavefront density of the image for the nominal wavelength. A higher number of input light beams can be used to generate a higher number of output beamlets.

Waveguide 910 is configured for in-coupling collimated incoming light beam 920 into waveguide 910 using a wavelength-sensitive input coupling element 912, e. g., an input coupling grating. The wavelength-sensitive input coupling element can be a diffraction grating whose diffraction properties depend on the wavelength of the incoming light beam. Wavelength-sensitive input coupling element 912 causes first light beam 921 and second light beam 922 to diffract at different angles as they enter waveguide 910. In the illustrated embodiment, the collimated incoming light beam is incident on the input coupling element 912 at normal incidence. However, this is not required by the present invention and operation at other angles of incidence are included with the scope of the present invention. Collimated incoming light beam is diffracted upon passing through input coupling element 912 at a non-normal angle of propagation inside waveguide 910.

The plurality of input light beams in collimated incoming light beam 920 are configured to propagate in waveguide 910 by total internal reflection (TIR) along different paths in different directions in waveguide 910. As shown in FIG. 9, first light beam 921 and second light beam 922 enter waveguide 910 at different angles. As a result, light beams 921 and 922 have different incident angles as they reach the surface of waveguide 910. Therefore, each of the input light beams traverses a different path in the waveguide, as shown in FIG. 9.

After passing through and diffracting from input coupling element 912, input light beams 921 and 922 propagate along waveguide 910 by total internal reflection (TIR), making multiple passes as they propagate from the end of waveguide 510 adjacent the input coupling element 912 toward the right end of output coupling element 514 optically coupled to the lower surface of waveguide 910. The waveguide 910 can be characterized by a longitudinal axis aligned with the direction of propagation of light along the waveguide. In FIG. 9, the longitudinal axis 905 is aligned with the top and bottom surfaces of the waveguide and is perpendicular to the direction of propagation of incoming light beam 920.

Waveguide 910 is further configured to output multiple groups of output light beams 930 using an output coupling element 914. As shown in FIG. 9, output coupling element 914 is coupled to waveguide 910 at a lower surface of the waveguide, and output coupling element 914 extends longitudinally along waveguide 910. Since each of the input light beams traverses a different path in the waveguide, they reach output coupling element 914 at different locations, where a portion of each beamlet is refracted and exits the waveguide to form an output beamlet and the remaining portion continues to propagate in the waveguide by TIR. FIG. 9 shows multiple groups of output light beams 930, including groups 950, 960, 970, and 980. Each group of output light beams includes a portion of each of the plurality of input light beams propagating in the waveguide by total internal reflection. For example, output beamlet group 950 includes a first beamlet 951 from part of incoming light beam 921 and a second beamlet 952 from part of incoming light beam 922. Similarly, output beamlet group 960 includes a first beamlet 961 from part of incoming light beam 921 and a second beamlet 962 from part of incoming light beam 922. Output beamlet group 970 includes a first beamlet 971 from part of incoming light beam 921 and a second beamlet 972 from part of incoming light beam 922. Output beamlet group 980 includes a first beamlet 981 from part of incoming light beam 921 and a second beamlet 982 from part of incoming light beam 922.

It can be seen that image display system 900 includes multiple input light beams having different wavelengths in the incoming collimated light beam 920 and a wavelength-sensitive input coupling element 912. By using a wavelength-sensitive input coupling element, the number of output beamlets can be increased. As a result, the wavefront sparsity or screen door effect can be reduced. The wavelength-sensitive input coupling element can be a diffraction grating whose diffraction properties depend on the wavelength of the incoming light beam.

Figure 10A:
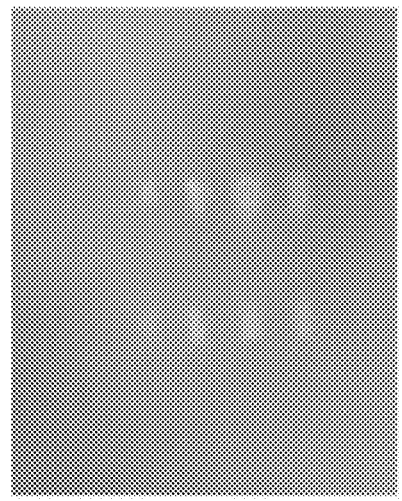
FIGS. 10A and 10B are images illustrating the reduction of the screen door effect by the optical device described above according to some embodiments of the present invention.
Figure 10B:
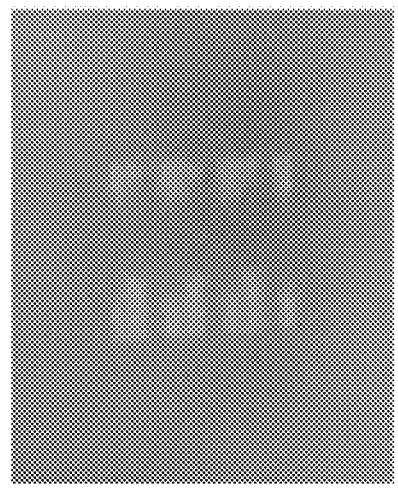

FIGS. 10A and 10B are images illustrating the reduction of the screen door effect by the optical device described above according to some embodiments of the present invention. In order to verify the function of the image display system described above, an experiment was carried out, in which an incoming light beam is provided by a combiner that received light of wavelengths 635 nm and 642 nm. The images from the waveguide eyepiece are viewed through a pinhole. FIG. 10A illustrates the screen effect caused by wavefront sparsity. The image appears as a sparsely sampled version of the original image. FIG. 10B is an image illustrating the reduction of the screen door effect by providing a single collimated incoming light beam that includes component light beams having wavelengths 635 nm and 642 nm. In this example, for two lasers with wavelengths 7 nm apart, there is a noticeable shift in the angles escaping from the pinhole, seen as additional spots in FIG. 10B.

As described above, the wavefront resolution is increased because, for a single angle beam, there is a set of beamlets that forms the original wavefront, but, with the addition of a second wavelength, there is a shifted set of beamlets that effectively increases the overall resolution of the wavefront corresponding to that input angle. This will improve the "screen door" or more correctly "wavefront sparsity" problem. More improvements can be achieved by increasing the number of beamlets with different wavelengths in the incoming collimated light beam. For example lasers of 630 nm, 635 nm and 640 nm can be in-coupled into a waveguide eyepiece nominally designed for 635 nm. In embodiments of the invention, light sources, such as Lasers, with a spectrum width of about 20 nm will significantly improve image quality. For eyepieces with no lensing function, this provides a way of increasing beamlet density independent of substrate thickness. For eyepieces with a lensing function, the focal plane for each wavelength is slightly different and could increase the depth of focus of the eyepiece.

Figure 11:
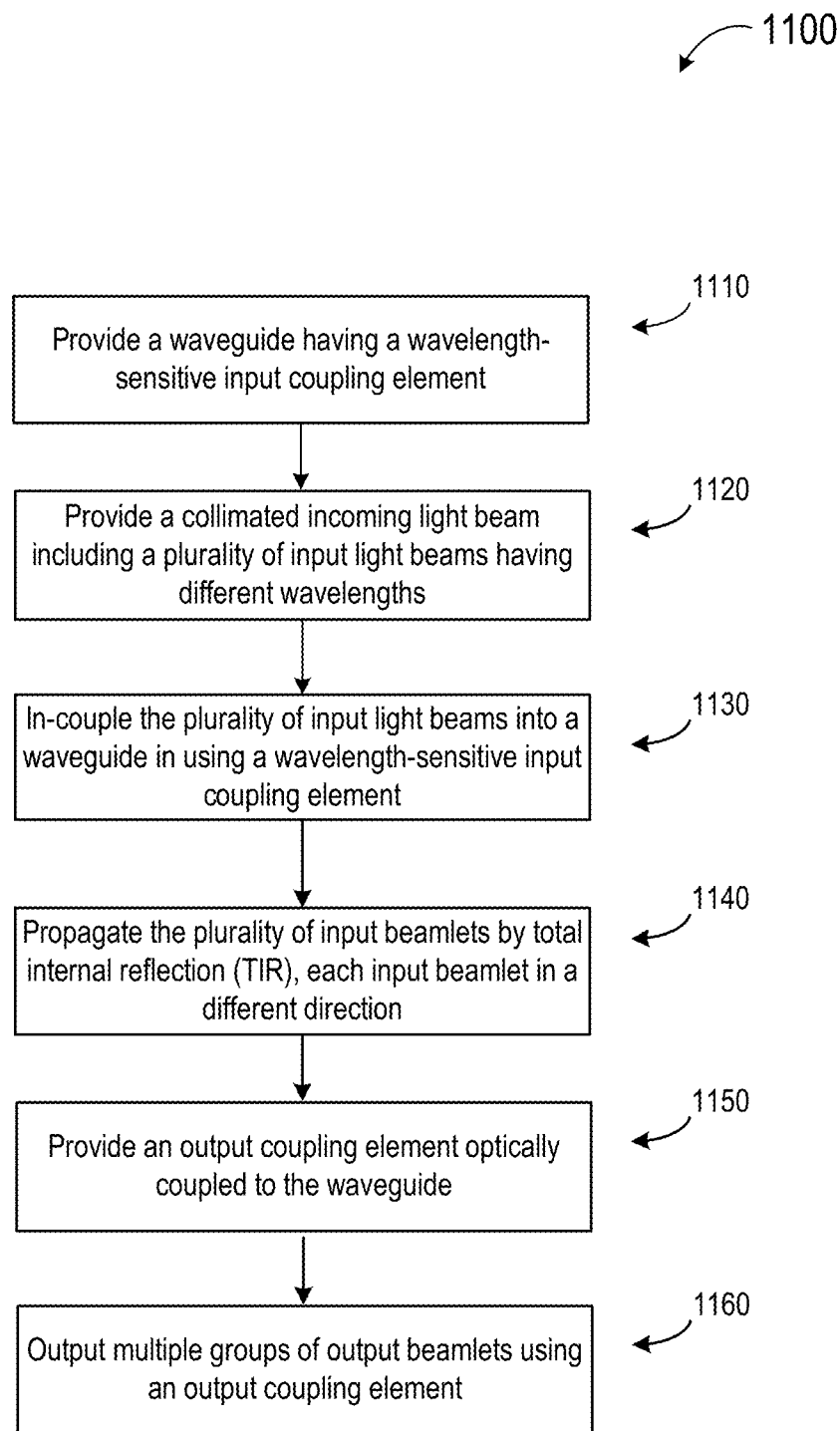
FIG. 11 is a simplified flowchart illustrating a method for displaying an image with reduced wavefront sparsity effect or screen door effect according to an embodiment of the present invention.

FIG. 11 is a simplified flowchart illustrating a method for displaying an image with reduced wavefront sparsity effect or screen door effect according to an embodiment of the present invention. As shown in FIG. 11, the method 1100 for displaying an image includes providing a waveguide having a wavelength-sensitive input coupling element (1110). Referring to FIG. 9, a waveguide 910 has a wavelength-sensitive input coupling element 912. The wavelength-sensitive input coupling element can be a diffraction grating whose diffraction properties depend on the wavelength of the incoming light beam.

The method also includes providing a collimated incoming light beam (1120). The collimated incoming light beam includes a plurality of input light beams having different wavelengths. As an example, in FIG. 9, collimated incoming light beam 920 includes a first light beam 921 having a first wavelength and a second light beam 922 having a second wavelength. In some embodiments, the different wavelengths are selected from a range of wavelengths centered around nominal wavelength for which a waveguide eyepiece is designed. In an embodiment, for a red image signal, lasers of wavelengths 630 nm, 635 nm and 640 nm can be in-coupled into a waveguide eyepiece nominally designed for 635 nm. In another embodiment, a single collimated incoming light beam that includes component light beams having wavelengths of 635 nm and 642 nm. In some embodiments, the plurality of input light beams can have wavelengths that span a spectrum width of about 20 nm. In these embodiments, the plurality of input light beams can be used to generate increased number of output beamlets that can increase the wavefront density of the image for the nominal wavelength.

The method also includes in-coupling the plurality of input light beams into a waveguide using the wavelength-sensitive input coupling element (1130). Referring to FIG. 9, the wavelength-sensitive input coupling element 912 is configured to in-couple collimated incoming light beam 920, which includes a first light beam 921 having a first wavelength and a second light beam 922 having a second wavelength. Wavelength-sensitive input coupling element 912 causes first light beam 921 and second light beam 922 to diffract at different angles as they enter waveguide 910.

Method 1100 also includes propagating the plurality of input light beams in the waveguide by total internal reflection (1140). As shown in FIG. 9, first light beam 921 and second light beam 922 enters waveguide 910 at different angles. As a result, light beams 921 and 922 have different incident angles as they reach a surface of waveguide 910. Therefore, each of the input light beams traverses a different path in the waveguide, as shown in FIG. 9.

The method further includes providing an output coupling element optically coupled to the waveguide (1150) and outputting multiple groups of output beamlets using the output coupling element (1160). As shown in FIG. 9, output coupling element 914 is coupled to waveguide 910 at a surface of the waveguide and extends longitudinally along waveguide 910. Since each of the input light beams traverse different paths in the waveguide, they reach output coupling element 914 at different locations, where a portion of each beamlet is refracted and exits the waveguide to form an output beamlet and the remaining portion continues to propagate in the waveguide by TIR. As shown in FIG. 9, multiple groups of output light beams 930 is emitted from output coupling element 914. The multiple groups of output light beams 930 include groups 950, 960, 970, and 980. Each group of output light beams includes a portion of each of the plurality of input light beams propagating in the waveguide by total internal reflection. For example, beamlet group 950 includes a first beamlet 951 from part of incoming light beam 921 and a second beamlet 952 from part of incoming light beam 922. Similarly, beamlet group 960 includes a first beamlet 961 from part of incoming light beam 921 and a second beamlet 962 from part of incoming light beam 922. Beamlet group 970 includes a first beamlet 971 from part of incoming light beam 921 and a second beamlet 972 from part of incoming light beam 922. Beamlet group 980 includes a first beamlet 981 from part of incoming light beam 921 and a second beamlet 982 from part of incoming light beam 922.

An example of an image display system that implements method 1100 is described above in connection with FIGS. 9 and 10. By using a wavelength-sensitive input coupling element, the number of output beamlets can be increased. The method can also include focusing the multiple groups of output light beamlets using an eye lens. Further, the incoming light beam can be provided with a fiber scanner. In some embodiments, the waveguide is configured for a nominal wavelength of a color, and the plurality of input light beams have wavelengths in the vicinity of the nominal wavelength.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An image display system comprising:
 a waveguide;
 an optical device configured for receiving an incoming light beam and providing a plurality of input beamlets to the waveguide, wherein the optical device comprises:
  a first prism and a second prism separated by an air gap, a first surface of the first prism and a second surface of the second prism being disposed in parallel and adjacent to each other across the air gap, the first surface being partially reflective and the second surface being substantially totally reflective,
   wherein the first prism and the second prism are configured to receive the incoming light beam and to provide a first plurality of beamlets;
   wherein the first surface is configured for receiving the incoming light beam and reflecting a first portion of the incoming light beam and to allow a second portion of the incoming light beam to pass through;
   the second surface is configured for reflecting each light beam from the first surface back to the first surface; and
   for each light beam directed to the first surface from the second surface, the first surface allowing a portion to pass through, and reflecting a remaining portion to the second surface;
   each beamlet of the first plurality of beamlets being derived from a portion of the incoming light beam, the first plurality of beamlets being offset spatially;
  a third prism and a fourth prism, a third surface of the third prism and a fourth surface of the fourth prism disposed in parallel and adjacent to each other, the third surface being partially reflective and the fourth surface being substantially totally reflective;
   wherein the third prism and the fourth prism are configured to receive the first plurality of beamlets and to provide the plurality of input beamlets, wherein the first plurality of beamlets enter the third prism perpendicular to a first side surface of the third prism; and
   wherein the first plurality of beamlets is offset spatially and traverses across a longitudinal direction of the waveguide, and the plurality of input beamlets is offset along a latitudinal direction of the waveguide, resulting in a 2D (two-dimensional) array of beamlets;
 wherein the waveguide is configured for:
  receiving the plurality of input beamlets;
  propagating the plurality of input beamlets by total internal reflection (TIR);
  providing an output coupling element optically coupled to the waveguide; and
  outputting multiple groups of output beamlets using the output coupling element, each group of output beamlets including a portion of each of the plurality of input beamlets propagating in the waveguide by total internal reflection.

2. The image display system of claim 1, wherein the plurality of input beamlets is directed in parallel toward the waveguide.

3. The image display system of claim 1, wherein the multiple groups of output beamlets are spaced apart by a bounce spacing of the waveguide.

4. The image display system of claim 1, wherein the partially reflective first surface is characterized by a uniform reflectivity.

5. The image display system of claim 1, wherein the waveguide comprises a top surface, a portion of which is configured for receiving the plurality of input beamlets from the optical device.

6. The image display system of claim 5, wherein the third surface and the fourth surface are configured to form an incoupling angle with the top surface of the waveguide.

7. The image display system of claim 1, wherein the waveguide is positioned in a lateral plane, the third and fourth surfaces being disposed at an oblique angle to the lateral plane.

8. The image display system of claim 1, wherein the plurality of input beamlets exit the third prism perpendicular to a second side surface of the third prism.

9. The image display system of claim 8, wherein the second side surface of the third prism is parallel to the waveguide.

10. The image display system of claim 8, wherein the first side surface of the third prism is perpendicular to the second side surface of the third prism.

* * * * *